(12) United States Patent
Kim et al.

(10) Patent No.: US 11,717,012 B2
(45) Date of Patent: Aug. 8, 2023

(54) COMPOSITION COMPRISING GINSENG SEED OIL

(71) Applicant: AMOREPACIFIC CORPORATION, Seoul (KR)

(72) Inventors: Su Hwan Kim, Yongin-si (KR); Sangyoul Na, Yongin-si (KR); Hyun Woo Jeong, Yongin-si (KR); Wanki Kim, Yongin-si (KR); Jisung Kim, Yongin-si (KR); Chan Woong Park, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 136 days.

(21) Appl. No.: 17/217,809

(22) Filed: Mar. 30, 2021

(65) Prior Publication Data
US 2021/0298339 A1    Sep. 30, 2021

(30) Foreign Application Priority Data

Mar. 31, 2020    (KR) .................... 10-2020-0039315

(51) Int. Cl.
| | | |
|---|---|---|
| *A23L 33/105* | (2016.01) | |
| *A23D 9/007* | (2006.01) | |
| *A23L 29/269* | (2016.01) | |
| *A23L 33/21* | (2016.01) | |

(52) U.S. Cl.
CPC .......... *A23L 33/105* (2016.08); *A23D 9/007* (2013.01); *A23L 29/272* (2016.08); *A23L 33/21* (2016.08)

(58) Field of Classification Search
CPC ............ A23V 2250/21; A23V 2200/30; A23V 2250/2124; A23L 33/105; A23L 33/10; A23L 33/21
See application file for complete search history.

(56) References Cited

U.S. PATENT DOCUMENTS

2003/0152544 A1    8/2003    Chen

FOREIGN PATENT DOCUMENTS

| CN | 1217932 A | * | 6/1999 | .......... A23L 33/105 |
|---|---|---|---|---|
| KR | 10-2013-0090029 A | | 8/2013 | |
| KR | 10-2014-0006538 A | | 1/2014 | |
| KR | 10-2016-0045347 A | | 4/2016 | |

(Continued)

OTHER PUBLICATIONS

Jun S et al. WO-2016068547 A1, Machine English Translation, May 6, 2016 (Year: 2016).*

(Continued)

*Primary Examiner* — Hong T Yoo
(74) *Attorney, Agent, or Firm* — Merchant & Gould P.C

(57) ABSTRACT

The present disclosure relates to an emulsion composition containing *ginseng* seed oil and *ginseng* berry extract, wherein the composition is a single phase. Whereas the existing composition containing a water-soluble ingredient as a main ingredient has the problem that, when *ginseng* seed oil is added, formulation stability is decreased as the *ginseng* seed oil is separated from the water-soluble ingredient, the emulsion composition according to the present disclosure exhibits superior stability because the *ginseng* seed oil is uniformly mixed with the water-soluble ingredient and separation of the *ginseng* seed oil from the water-soluble ingredient does not occur for a long period of time.

10 Claims, 3 Drawing Sheets

(56) References Cited

FOREIGN PATENT DOCUMENTS

| | | |
|---|---|---|
| KR | 10-2018-0002079 A | 1/2018 |
| KR | 10-2018-0092599 A | 8/2018 |
| KR | 10-2019-0131817 A | 11/2019 |
| WO | WO-2016068547 A1 * | 5/2016 ........... A23L 33/105 |

OTHER PUBLICATIONS

Zhao et al. CN 1217932 A, Machine English Translation, Jun. 2, 1999 (Year: 1999).*

* cited by examiner

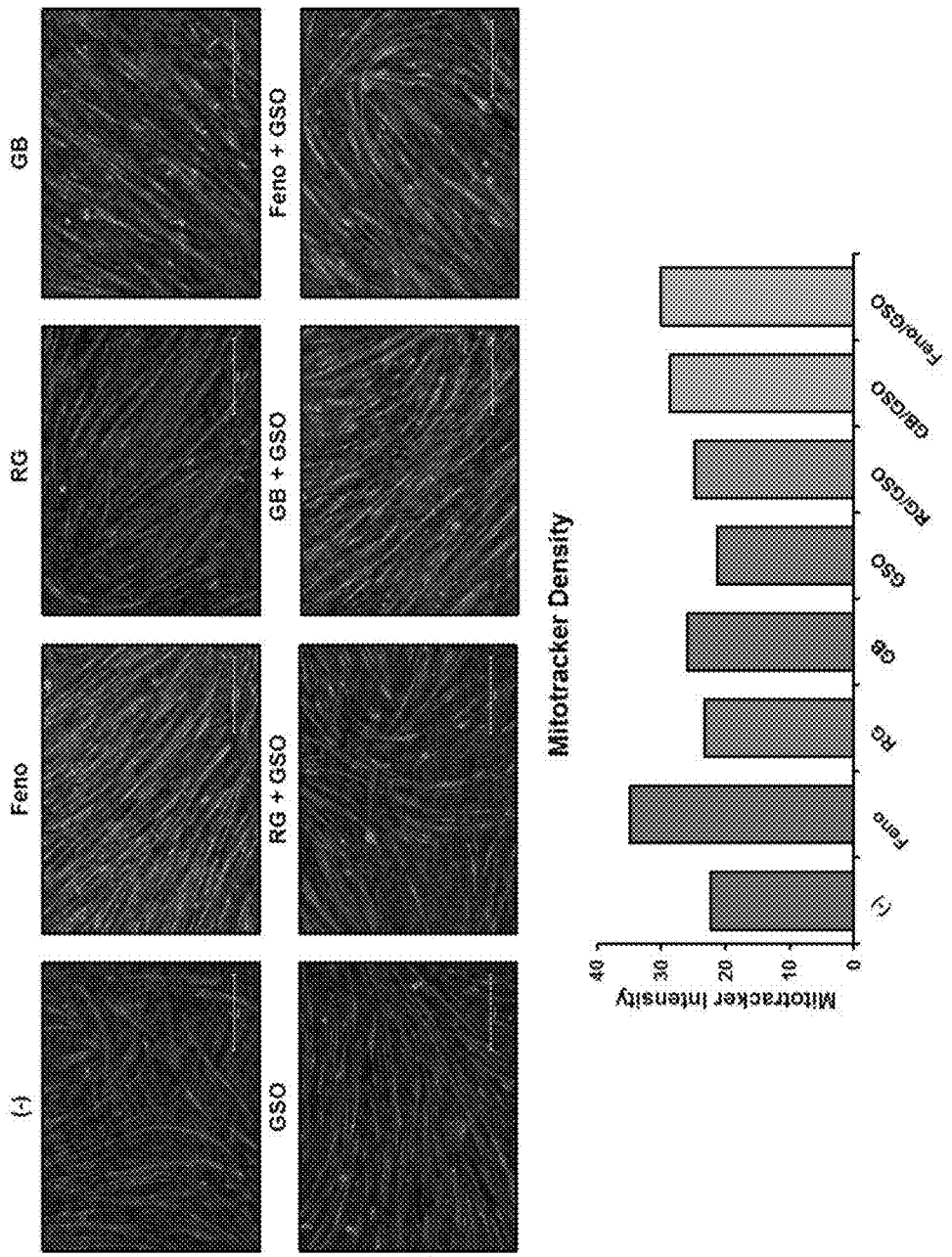

COMPOSITION COMPRISING GINSENG SEED OIL

CROSS-REFERENCE TO RELATED APPLICATION

This application claims the priority of Korean Patent Application No. 10-2020-0039315, filed on Mar. 31, 2020, the contents of which in their entirety are herein incorporated by reference.

TECHNICAL FIELD

The present disclosure relates to an emulsion composition containing *ginseng* seed oil and *ginseng* berry extract.

BACKGROUND ART

*Ginseng* is a plant belonging to the genus *Panax* of the family Araliaceae, which has been used in Korea, China, Japan, etc. from about 2,000 years ago for the purpose of preventing diseases and extending life span. The effects and efficacies of *ginseng* known thus far include effects on the central nervous system, anticarcinogenic actions and anticancer activities, immunoregulatory actions, antidiabetic actions, liver function-improving effects, cardiovascular disease-improving and anti-arteriosclerotic actions, blood pressure-regulating actions, menopausal disorder-improving effects, effects on osteoporosis, anti-stress and anti-fatigue actions, antioxidant activities, antiaging effects, etc. Ginsenosides, which are the representative physiologically active ingredients of *ginseng*, are distributed uniformly in the area and subterrestrial parts of *ginseng*, and a considerable amount of ginsenosides are distributed in the *ginseng* seed, too.

A lot of researches have been conducted on the main ingredients of *ginseng* and the pharmacological actions thereof. When considering the pharmacological effects of *ginseng*, it is expected that various adult diseases may be prevented and the risk of onset thereof may be reduced by long-term intake of *ginseng*.

However, because *ginseng* seed oil or a composition consisting mainly of *ginseng* seed oil is difficult to take due to the greasiness of the oil, it has to be taken in the form of a capsule. In addition, when *ginseng* seed oil is included in a composition containing a water-soluble ingredient as a main ingredient, there is a problem that the stability of the composition is decreased as the *ginseng* seed oil is separated from the water-soluble ingredient.

DISCLOSURE

Technical Problem

In an aspect, the present disclosure is directed to providing a stable emulsion composition wherein *ginseng* seed oil is uniformly mixed with a water-soluble ingredient.

Technical Solution

In an aspect, the present disclosure provides an emulsion composition containing *ginseng* seed oil and *ginseng* berry extract.

In an exemplary embodiment, the emulsion composition is a single phase.

In an exemplary embodiment, the *ginseng* may include one or more selected from a group consisting of Korean *ginseng* (*Panax ginseng*), American *ginseng* (*Panax quinquefolia*), tienchi *ginseng* (*Panax notoginseng*), Vietnamese *ginseng* (*Panax vietnamensis*), Japanese *ginseng* (*Panax japonicus*), *Panax elegatior*, *Panax wangianus*, *Panax bipinnatifidus* and *Panax pseudoginseng*.

In an exemplary embodiment, the *ginseng* berry extract may be an extract of water, a $C_1$-$C_6$ alcohol, or a mixture solvent thereof.

In an exemplary embodiment, the composition may contain the *ginseng* seed oil in an amount of 0.001-70 wt % based on the total weight of the composition.

In an exemplary embodiment, the composition may contain the *ginseng* berry extract in an amount of 0.01-60 wt % based on the total weight of the composition.

In an exemplary embodiment, a weight ratio of the *ginseng* seed oil and the *ginseng* berry extract may be 1:2-100.

In an exemplary embodiment, the composition may further contain gum and dietary fiber.

In an exemplary embodiment, the gum may include one or more selected from a group consisting of xanthan gum, carrageenan gum, guar gum, gellan gum, locust bean gum, tamarind gum, Arabic gum, konjac, pectin, agar, tapioca starch, dextrin, hydroxypropyl methylcellulose (HPMC), sodium alginate and modified starch.

In an exemplary embodiment, the dietary fiber may be one or more selected from a group consisting of citrus dietary fiber and wheat dietary fiber.

Advantageous Effects

In an aspect, a composition according to the present disclosure exhibits superior stability because *ginseng* seed oil is uniformly mixed with a water-soluble ingredient and separation of the *ginseng* seed oil from the water-soluble ingredient does not occur for a long period of time.

BRIEF DESCRIPTION OF DRAWINGS

FIG. 4 shows the synergistic effect on mitochondrial production of *ginseng* seed oil and *ginseng* berry extract according to an exemplary embodiment of the present disclosure.

BEST MODE

Figure 1:
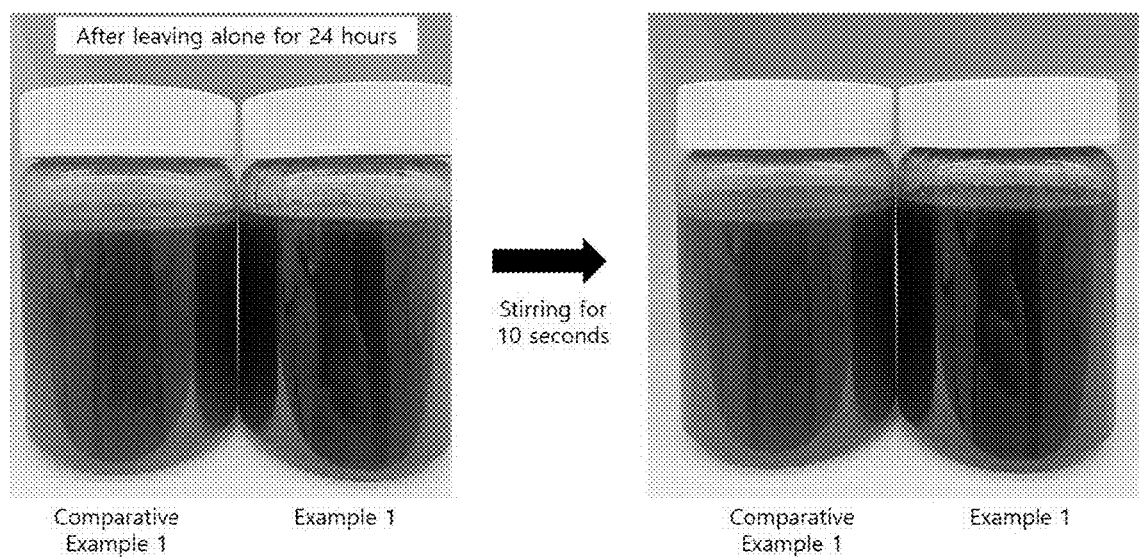
FIG. 1 compares the emulsion stability of Example 1 and Comparative Example 1.

Hereinafter, the present disclosure is described in detail.

In an aspect, the present disclosure provides an emulsion composition containing *ginseng* seed oil and *ginseng* berry extract. The present disclosure may provide a stable emulsion composition containing *ginseng* seed oil and *ginseng* berry extract by preventing the separation of the *ginseng* seed oil from a water-soluble ingredient.

In an exemplary embodiment, the emulsion composition may be a single phase. In the present disclosure, the 'single phase' means that one phase is maintained in the emulsion composition, without an oil phase being separated from a water phase.

The "oil phase" refers to a phase which is not mixed well with a water phase, and may include an oil, an organic solvent or a mixture thereof which is liquid at room temperature and atmospheric pressure. The "water phase" refers to a phase which is not mixed well with an oil phase, and may include any one which is capable of dissolving a water-soluble polymer well, without limitation. Examples may include water such as purified water, distilled water, etc., a polyol, etc.

In an exemplary embodiment, the ginseng may include one or more selected from a group consisting of Korean ginseng (Panax ginseng), American ginseng (Panax quinquefolia), tienchi ginseng (Panax notoginseng), Vietnamese ginseng (Panax vietnamensis), Japanese ginseng (Panax japonicus), Panax elegatior, Panax wangianus, Panax bipinnatifidus and Panax pseudoginseng, although not being limited thereto.

In the present disclosure, as a method for obtaining the "ginseng seed oil", compression, supercritical extraction, subcritical extraction, microwave extraction, ultrasonic extraction, etc. may be used. However, any method obvious to those skilled in the art may be used without limitation. The ginseng seed used to prepare the ginseng seed oil of the present disclosure includes germinated ginseng seed such as dehisced ginseng seed or ungerminated germinated ginseng. It may also be live, sun-dried or hot air-dried ginseng seed. For example, when compression method is used, ginseng seed oil may be obtained by adding ginseng seed or ginseng seed powder to an oil press and compressing at room temperature (about 15-25° C.) for 3-20 minutes. The oil press may be any one used for food processing without limitation. When supercritical extraction method is used, after adding ginseng seed or ginseng seed powder to a supercritical extraction vessel, adding 50 mL to 1 L of an extraction solvent per 1 g of the ginseng seed powder and then adding a supercritical fluid (e.g., carbon dioxide), extraction may be performed for 3-4 hours while maintaining the pressure of the extraction vessel at 300-500 bar.

In an exemplary embodiment, the ginseng seed oil may be subjected to a purification process if necessary. The purification process is not particularly limited and any method known in the art may be used. For example, after filtration under reduced pressure, followed by ion-exchange resin or silica gel column chromatography, the product may be freeze-dried or the solvent may be removed through concentration.

In the present disclosure, the "ginseng berry" may refer the fruit of ginseng obtained during the cultivation of ginseng. It may refer the fruit of ginseng ripening for about a week around the middle of June in specifically 3- to 5-year-old ginseng, more specifically 4-year-old ginseng. In the present disclosure, the ginseng berry is not limited in how it is obtained. It may be obtained by cultivation or may be purchased commercially. The ginseng berry contains more mineral ingredients including vitamins and ginsenosides than ginseng root which is generally used in the art. In particular, the composition of ginsenosides in the ginseng berry is entirely different from that of ginseng root. More specifically, since the ginseng berry contains more protopanaxatriol (PT)-based ginsenosides including ginsenosides Re, Rg1, Rg2, etc. than protopanaxadiol (PD)-based ginsenosides including ginsenosides Rb1, Rb2, Rc, Rd, etc., it can exhibit remarkably superior effect as compared to ginseng root.

In the present disclosure, the "ginseng berry extract" includes all the substances extracted from ginseng berry regardless of extraction method, extraction solvent, extracted ingredients or extract type, and includes the substances by an extraction method of treating the substances with heat, acids, bases, enzymes, etc. The term is used in a broad concept, including all the substances that may be obtained by processing or treating the substances extracted from ginseng berry. Specifically, the processing or treatment may include fermenting or enzymatically treating the ginseng berry extract. Accordingly, the ginseng berry extract of the present disclosure may be a fermentation product. Also, in the present disclosure, the ginseng berry extract may be an extract of ginseng berry, and may be specifically an extract of live ginseng berry or an extract of dried ginseng berry. In the present disclosure, the live ginseng berry, dried ginseng berry or other processed ginseng berry that may be used for extraction (e.g. fermentation product, dried pulverization product, etc.) may have similar or identical composition. Accordingly, the live ginseng berry, dried ginseng berry or other processed ginseng berry having have similar or identical composition may exhibit the same effect of the ginseng berry extract disclosed in the present disclosure.

In the present disclosure, as the extraction method for obtaining the "ginseng berry extract", hot extraction, cold extraction, reflux condensation extraction, ultrasonic extraction, etc. may be used. However, any extraction method obvious to those skilled in the art may be used without limitation. As the ginseng berry used for preparing the ginseng berry extract of the present disclosure, dried ginseng berry, fresh ginseng berry, ginseng berry powder, etc. may be used, and anything prepared from fresh ginseng berry may be used without limitation. The ginseng berry extract of the present disclosure may be an extract of water, an organic solvent or a mixture solvent thereof. The organic solvent may be a $C_1$-$C_6$ alcohol, acetone, hexane, ethyl acetate, carbon dioxide or a mixture organic solvent, although not being limited thereto. The ginseng berry extract of the present disclosure includes one obtained by concentrating the extract extracted with the extraction solvent under reduced pressure. Specifically, the concentration under reduced pressure may be performed at 35-50° C., although not being limited thereto. When the concentration under reduced pressure is performed within the above temperature range, a synergistic effect of the various ingredients in the ginseng berry extract of the present disclosure may be achieved. In this aspect, the concentration under reduced pressure may be performed specifically at 36° C. or higher, 37° C. or higher, 38° C. or higher, 39° C. or higher, 40° C. or higher, 41° C. or higher or 42° C. or higher and/or at 49° C. or lower, 48° C. or lower, 47° C. or lower, 46° C. or lower, 45° C. or lower, 44° C. or lower or 43° C. or lower. In addition, the concentration under reduced pressure may be performed specifically at 600 mmHg higher, 620 mmHg higher, 640 mmHg higher, 650 mmHg higher, 660 mmHg higher, 680 mmHg higher, 700 mmHg higher, 720 mmHg higher or 740 mmHg higher and/or at 760 mmHg lower, 740 mmHg lower, 720 mmHg lower, 700 mmHg lower, 680 mmHg lower, 660 mmHg lower, 650 mmHg lower, 640 mmHg lower, 620 mmHg lower or 600 mmHg lower.

In an exemplary embodiment, the composition may contain the ginseng seed oil in an amount of 0.001-70 wt % based on the total weight of the composition. When the ginseng seed oil is contained in an amount exceeding 70 wt %, the stability of the composition may decrease. Specifically, the composition may contain the ginseng seed oil in an amount of 0.001 wt % or more, 0.002 wt % or more, 0.003 wt % or more, 0.005 wt % or more, 0.007 wt % or more, 0.01 wt % or more, 0.02 wt % or more, 0.03 wt % or more, 0.05 wt % or more, 0.07 wt % or more, 0.1 wt % or more, 0.2 wt % or more, 0.3 wt % or more, 0.5 wt % or more, 0.7 wt % or more, 1 wt % or more, 1.1 wt % or more, 1.2 wt % or more, 1.3 wt % or more, 1.4 wt % or more, 1.5 wt % or more, 2 wt % or more, 3 wt % or more, 4 wt % or more, 5 wt % or more, 6 wt % or more, 7 wt % or more, 8 wt % or more, 9 wt % or more, 10 wt % or more, 11 wt % or more, 12 wt % or more, 13 wt % or more, 14 wt % or more or 15 wt % or more, and 70 wt % or less, 69 wt % or less, 68 wt % or less, 67 wt % or less, 66 wt % or less, 65 wt % or less, 64 wt % or less, 63 wt % or less, 62 wt % or less, 61 wt % or less, 60 wt % or less, 59 wt % or less, 58 wt % or less, 57 wt % or less, 56 wt % or less, 55 wt % or less, 54 wt % or less, 53 wt % or less, 52 wt % or less, 51 wt % or less, 50 wt % or less, 49 wt % or less, 48 wt % or less, 47 wt % or less, 46 wt % or less, 45 wt % or less, 44 wt % or less, 43 wt % or less, 42 wt % or less, 41 wt % or less or 40 wt % or less. In an exemplary embodiment, the composition may contain the *ginseng* berry extract in an amount of 0.0.01-60 wt % based on the total weight of the composition. When the *ginseng* berry extract is contained in an amount exceeding 60 wt %, processing may be inconvenient due to poor flowability. Specifically, the composition may contain the *ginseng* berry extract in an amount of 0.01 wt % or more, 0.02 wt % or more, 0.03 wt % or more, 0.05 wt % or more, 0.07 wt % or more, 0.1 wt % or more, 0.2 wt % or more, 0.3 wt % or more, 0.5 wt % or more, 0.7 wt % or more, 1 wt % or more, 2 wt % or more, 3 wt % or more, 5 wt % or more, 7 wt % or more, 9 wt % or more, 10 wt % or more, 11 wt % or more, 12 wt % or more, 13 wt % or more, 14 wt % or more, 15 wt % or more, 16 wt % or more, 17 wt % or more, 18 wt % or more, 19 wt % or more or 20 wt % or more, and 60 wt % or less, 59 wt % or less, 58 wt % or less, 57 wt % or less, 56 wt % or less, 55 wt % or less, 54 wt % or less, 53 wt % or less, 52 wt % or less, 51 wt % or less, 50 wt % or less, 48 wt % or less, 46 wt % or less, 44 wt % or less, 42 wt % or less or 40 wt % or less.

In an exemplary embodiment, a weight ratio of the *ginseng* seed oil and the *ginseng* berry extract may be 1:2-100, 1:2-50, 1:2-15, 1:7-13 or 1:10. When the weight ratio of the *ginseng* seed oil and the *ginseng* berry extract is outside the above range, formulation stability may decrease due to separation of an oil layer.

In an exemplary embodiment, the composition does not contain a surfactant. The present disclosure provides an emulsion composition which is dispersed stably even when a surfactant is substantially absent. The expression that "a surfactant is substantially absent" means that the use of a surfactant can be minimized or completely avoided, and means that a surfactant is contained in an amount of 1% or less, specifically 0.5% or less, more specifically 0.1% or less, more specifically 0.01% or less, based on the total weight of the composition.

In an exemplary embodiment, the composition may further contain gum and dietary fiber.

In an exemplary embodiment, the gum may include one or more selected from a group consisting of xanthan gum, carrageenan gum, guar gum, gellan gum, locust bean gum, tamarind gum, Arabic gum, konjac, pectin, agar, tapioca starch, dextrin, hydroxypropyl methylcellulose (HPMC), sodium alginate and modified starch.

In an exemplary embodiment, the composition may contain the gum in an amount of 0.001-5 wt % based on the total weight of the composition. When the gum is contained in an amount exceeding 5 wt %, the composition may be inconvenient to swallow due to excessive foaming. Specifically, the composition may contain the gum in an amount of 0.001 wt % or more, 0.002 wt % or more, 0.003 wt % or more, 0.005 wt % or more, 0.007 wt % or more, 0.01 wt % or more, 0.02 wt % or more, 0.03 wt % or more, 0.04 wt % or more, 0.05 wt % or more, 0.06 wt % or more, 0.07 wt % or more, 0.08 wt % or more, 0.09 wt % or more or 0.1 wt % or more, and 5 wt % or less, 4.9 wt % or less, 4.8 wt % or less, 4.7 wt % or less, 4.6 wt % or less, 4.5 wt % or less, 4.4 wt % or less, 4.3 wt % or less, 4.2 wt % or less, 4.1 wt % or less, 4 wt % or less, 3.9 wt % or less, 3.8 wt % or less, 3.7 wt % or less, 3.6 wt % or less, 3.5 wt % or less, 3.4 wt % or less, 3.3 wt % or less, 3.2 wt % or less, 3.1 wt %, 3 wt % or less, 2.9 wt % or less, 2.8 wt % or less, 2.7 wt % or less, 2.6 wt % or less, 2.5 wt % or less, 2.4 wt % or less, 2.3 wt % or less, 2.2 wt % or less, 2.1 wt % or less or 2 wt % or less.

In an exemplary embodiment, the dietary fiber may include one or more selected from a group consisting of citrus dietary fiber and wheat dietary fiber.

In an exemplary embodiment, the composition may contain the dietary fiber in an amount of 0.001-20 wt % based on the total weight of the composition. When the dietary fiber is contained in an amount exceeding 20 wt %, formulation stability may decrease due to excessive foaming. Specifically, the composition may contain the dietary fiber in an amount of 0.001 wt % or more, 0.002 wt % or more, 0.003 wt % or more, 0.005 wt % or more, 0.007 wt % or more, 0.01 wt % or more, 0.02 wt % or more, 0.03 wt % or more, 0.04 wt % or more, 0.05 wt % or more, 0.06 wt % or more, 0.07 wt % or more, 0.08 wt % or more, 0.09 wt % or more, 0.1 wt % or more, 0.2 wt % or more, 0.3 wt % or more, 0.4 wt % or more or 0.5 wt % or more, and 20 wt % or less, 19 wt % or less, 18 wt % or less, 17 wt % or less, 16 wt % or less, 15 wt % or less, 14 wt % or less, 13 wt % or less, 12 wt % or less, 11 wt % or less, 10 wt % or less, 9 wt % or less, 8 wt % or less, 7 wt % or less, 6 wt % or less, 5 wt % or less, 4.8 wt % or less, 4.6 wt % or less, 4.4 wt % or less, 4.2 wt % or less, 4 wt % or less, 3.8 wt % or less, 3.6 wt % or less, 3.4 wt % or less, 3.2 wt % or less, 3 wt % or less, 2.8 wt % or less, 2.6 wt % or less, 2.4 wt % or less, 2.2 wt % or less or 2 wt % or less.

In an exemplary embodiment, the *ginseng* berry extract may be an extract of water, an organic solvent or a mixture solvent thereof. The water may include distilled water or purified water, and the organic solvent may be an alcohol, acetone hexane, ethyl acetate, carbon dioxide or a mixture organic solvent thereof, although not being limited thereto. The alcohol may be a $C_1$-$C_6$ lower alcohol.

In an exemplary embodiment, the composition may be a liquid composition.

In an exemplary embodiment, the composition may be a food composition. The formulation type of the food composition is not particularly limited. For example, it may be formulated as a tablet, a granule, a pill, a liquid such as a drink, a caramel, a gel, a bar, a tea bag, etc. Each formulation of the food composition may contain, in addition to the active ingredient, ingredients commonly used in the art depending on the particular formulation or purpose of use. They may be adequately selected by those skilled in the art and a synergistic effect may be achieved when they are used together with the active ingredient.

The food composition according to an exemplary embodiment may contain various nutrients, vitamins, minerals (electrolytes), flavorants including synthetic flavorants and natural flavorants, extenders (cheese, chocolate, etc.), pectic acid and its salts, alginic acid and its salts, organic acids, protective colloidal thickeners, pH-adjusting agents, stabilizers, antiseptics, glycerin, alcohols, carbonating agents used in carbonated beverages, etc. In addition, the food composition according to an exemplary embodiment may contain a pulp for preparation of natural fruit juices, fruit juice beverages and vegetable beverages. These ingredients may be used either independently or in combination. The proportion of these additives is of no great importance. In general, they are contained within a range of about 0-50 parts by weight based on 100 parts by weight of the composition according to an exemplary embodiment of the present disclosure.

In an exemplary embodiment, the composition may be a composition for promoting energy metabolism in muscles.

In an exemplary embodiment, the composition may be a composition for facilitating fat oxidation.

In an exemplary embodiment, the composition may be a composition for increasing and activating mitochondria.

In an aspect, the present disclosure provides a capsule containing the emulsion composition. The capsule may be a soft or hard capsule.

In an aspect, the present disclosure provides a use of *ginseng* seed oil and *ginseng* berry extract for use in preparation of a composition for promoting energy metabolism in muscles.

In an aspect, the present disclosure provides a use of *ginseng* seed oil and *ginseng* berry extract for use in manufacturing of a composition for facilitating fat oxidation.

In an aspect, the present disclosure provides a use of *ginseng* seed oil and *ginseng* berry extract for use in manufacturing of a composition for increasing and activating mitochondria.

In an aspect, the present disclosure provides a method for promoting energy metabolism in muscles by administering the emulsion composition containing *ginseng* seed oil and *ginseng* berry extract described above.

In an aspect, the present disclosure provides a method for oxidizing fat in the body by administering the emulsion composition containing *ginseng* seed oil and *ginseng* berry extract described above.

In an aspect, the present disclosure provides a method for increasing and activating mitochondria by administering the emulsion composition containing *ginseng* seed oil and *ginseng* berry extract described above.

Hereinafter, the present disclosure will be described in more detail through examples, etc. These examples are merely for illustrating the present disclosure and it will be obvious to those having ordinary knowledge in the art that the scope of the present disclosure is not limited by the examples.

[Preparation Example 1] Preparation of *Ginseng* Seed Oil

*Ginseng* seeds were separated from the harvest berry of live *ginseng* (*Panax ginseng* C.A. Meyer). After washing the obtained *ginseng* seeds and removing impurities, only the compressible seeds were selected. After drying and pulverizing the seeds and removing impurities, crude *ginseng* seed oil was obtained by compressing with an oil press (DS-1500, Dasan Food Industrial Machinery, Korea). *Ginseng* seed oil was prepared by purifying and filtering the extracted crude *ginseng* seed oil.

[Preparation Example 2] Preparation of *Ginseng* Berry Extract

A *ginseng* berry raw material was prepared by mixing the pulp and juice of the berry of live *ginseng* (*Panax ginseng* C.A. Meyer) with the pericarp removed. A *ginseng* berry extract was prepared by adding 3 L of ethanol to 1 kg of the prepared *ginseng* berry raw material, performing reflux extraction at 25° C. for 4 hours, and then concentrating under reduced pressure.

[Preparation Example 3] Preparation of Red *Ginseng* Extract

After adding 1 kg of a red *ginseng* raw material to an extractor, 3 L of a solvent water and ethanol with a volume ratio of 1:1 was added to the extractor. After extracting repeatedly 4 times at 70° C. for 10 hours, the extract was compression-filtered through a 250-mesh filter. A red *ginseng* extract was prepared by concentrating the resulting solution at 600 mmHg and 70° C. in a vacuum concentrator and then steam-sterilizing at 83° C. for 20 minutes in a sterilization tank.

Example 1

An emulsion composition of *ginseng* seed oil and *ginseng* berry extract of Example 1 was prepared according to the composition described in Table 1. Specifically, after adding the *ginseng* seed oil of Preparation Example 1 to the *ginseng* berry extract of Preparation Example 2, the mixture was stirred at 200 rpm using an Agi mixer while heating at 70° C. After adding a solution obtained by stirring the *ginseng* seed oil in the *ginseng* berry extract to purified water, Example 1 was prepared by stirring at 200 rpm using an Agi mixer (or homogenizer) at 80° C.

TABLE 1

| (Unit: wt %) | Example 1 | Example 2 | Comparative Example 1 | Comparative Example 2 |
| --- | --- | --- | --- | --- |
| Ginseng seed oil | 2.5 | 2.5 | 2.5 | 2.5 |
| Ginseng berry extract | 25 | 25 | — | — |
| Red ginseng extract | — | — | 25 | 25 |
| Gellan gum | — | 0.1 | — | 0.1 |
| Citrus dietary fiber | — | 0.4 | — | 0.4 |
| Purified water | To 100 | To 100 | To 100 | To 100 |
| Total | 100 | 100 | 100 | 100 |

Example 2

Example 2, which is an emulsion composition of *ginseng* seed oil and *ginseng* berry extract containing gellan gum and dietary fiber, was prepared according to the composition described in Table 1. Specifically, after adding the *ginseng* seed oil of Preparation Example 1 to the *ginseng* berry extract of Preparation Example 2, the mixture was stirred at 200 rpm using an Agi mixer while heating at 70° C. After adding gellan gum and citrus dietary fiber to purified water, the gellan gum and citrus dietary fiber were wetted by heating at 80° C. Then, after adding a solution obtained by stirring the *ginseng* seed oil in the *ginseng* berry extract to the purified water in which the gellan gum and citrus dietary fiber were wetted, Example 2 was prepared by stirring at 200 rpm using an Agi mixer at 80° C.

Comparative Example 1

A composition of Comparative Example 1 was prepared according to the composition described in Table 1. Specifically, after adding the *ginseng* seed oil of Preparation Example 1 to the red *ginseng* extract of Preparation Example 3, the mixture was stirred at 200 rpm using an Agi mixer while heating at 70° C. After adding a solution obtained by stirring the *ginseng* seed oil in the red *ginseng* to purified water, Comparative Example 1 was prepared by stirring at 200 rpm using an Agi mixer at 80° C.

Comparative Example 2

A composition of Comparative Example 2, which contains gellan gum and dietary fiber, was prepared according to the composition described in Table 1. Specifically, after adding the *ginseng* seed oil of Preparation Example 1 to the red *ginseng* extract of Preparation Example 3, the mixture was stirred at 200 rpm using an Agi mixer while heating at 70° C. After adding gellan gum and citrus dietary fiber to purified water, the gellan gum and citrus dietary fiber were wetted by heating at 80° C. Then, after adding a solution obtained by stirring the *ginseng* seed oil in the red *ginseng* extract to the purified water in which the gellan gum and citrus dietary fiber were wetted, Comparative Example 2 was prepared by stirring at 200 rpm using an Agi mixer at 80° C.

[Test Example 1] Investigation of Emulsion Stability

Immediately after the preparation of Examples 1-2 and Comparative Examples 1-2, the state of the mixed compositions was observed. After leaving the compositions alone at 25° C. for 24 hours and then stirring for 10 seconds, separation of an oil phase and a water phase was investigated. The result is shown in Table 2 and FIGS. 1-2.

TABLE 2

|  | Example 1 | Example 2 | Comparative Example 1 | Comparative Example 2 |
|---|---|---|---|---|
| Immediately after preparation | Uniformly mixed | Uniformly mixed | Oil phase separated | Excessive foaming |
| After leaving alone for 24 hours | Uniformity maintained | Uniformity maintained | Oil phase separated | Excessive foaming |

Figure 2:
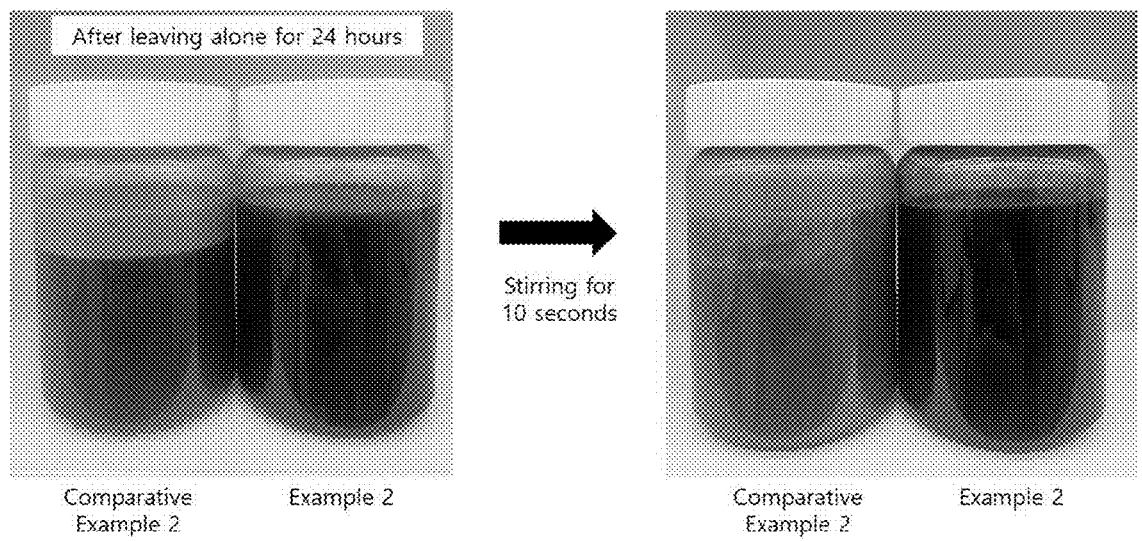
FIG. 2 compares the emulsion stability of Example 2 and Comparative Example 2.

As can be seen from Table 2 and FIGS. 1-2, the oil ingredients were mixed uniformly in Examples 1 and 2 containing the *ginseng* seed oil and the *ginseng* berry extract and the uniformity was maintained stably even 24 hours later, suggesting that they have a single phase. In contrast, the separation of an oil phase occurred in Comparative Examples 1 and 2 containing the *ginseng* seed oil and the red *ginseng* extract because the oil ingredients were not mixed uniformly with the water-soluble ingredient ingredients. In addition, excessive foaming was observed for Comparative Example 2 containing the gellan gum.

[Test Example 2] Measurement of Ginsenoside Absorption

For measurement of ginsenoside absorption, each of Example 1, Comparative Example 1, *ginseng* berry extract (Preparation Example 2 wad diluted 4-fold with purified water) and red *ginseng* extract (Preparation Example 3 wad diluted 4-fold with purified water) was passed through a human digestion simulation system and the amount of ginsenosides transferred to Caco-2 cells (ATCC), which are human-derived small intestinal cells was measured. Specifically, in the salivary phase of the human digestion simulation system, amylase (2 mL) was added to the sample (Example 1, Comparative Example 1, *ginseng* berry extract or red *ginseng* extract) and the mixture was stirred at 37° C., pH 6.9 and 100 rpm for 3 minutes. Then, in the gastric phase, pepsin (4 mL) was added to the sample that had passed through the salivary phase and then the mixture was stirred at 37° C., pH 2 (1 M HCl) and 100 rpm for 1 hour for digestion. Then, in the small intestinal phase, lipase, pancreatin, bile acid and amyloglucosidase were added to the sample that had been digested in the gastric phase and then the mixture was stirred at 37° C., pH 5.3 (1 M $NaHCO_3$) and 100 rpm for 2 hours. The sample that had passed through the human digestion simulation system was centrifuged and the supernatant was diluted 10-fold with DMEM. Caco-2 cells were cultured with the DMEM-treated sample on Transwell under the condition of 37° C. and 5% $CO_2$ for 2 hours. The cultured Caco-2 cells were recovered and the amount of ginsenosides absorbed by the Caco-2 cells was measured by high-performance liquid chromatography (HPLC). The result is given in Table 3.

TABLE 3

| | Content of ginsenosides absorbed by Caco-2 cells (%) | | | | | | | | | |
|---|---|---|---|---|---|---|---|---|---|---|
| | Rg1 | Re | Rb1 | Rc | Rg2 | Rb2 | Rb3 | Rd | Rg3 | Total |
| Ex. 1 | 0.022 | 0.028 | 0.008 | 0.013 | 0.009 | 0.011 | 0.011 | 0.010 | 0.112 | 0.113 |
| Comp. Ex. 1 | 0.009 | 0.015 | 0.006 | 0.004 | 0.001 | 0.003 | 0.003 | 0.003 | 0.003 | 0.042 |
| Ginseng berry extract | 0.015 | 0.021 | 0.008 | 0.009 | 0.005 | 0.009 | 0.010 | 0.007 | 0.084 | 0.087 |
| Red ginseng extract | 0.009 | 0.014 | 0.004 | 0.003 | 0.001 | 0.002 | 0.002 | 0.000 | 0.035 | 0.036 |

As can be seen from Table 3, Example 1 containing the *ginseng* seed oil and the *ginseng* berry extract showed the highest content of ginsenosides absorbed by the small intestinal cells and also exhibited excellent formulation stability.

[Test Example 3] Measurement of Expression of Energy Metabolism-Related Genes Depending on Addition of *Ginseng* Seed Oil Mouse-derived myoblasts acquired from ATCC were cultured in a 5% $CO_2$ incubator at 37° C. using Dulbecco's modified essential medium (DMEM; Sigma Aldrich) supplemented with 10% fetal bovine serum (HyClone) and 1% penicillin/streptomycin (PIS; Sigma Aldrich). When the myoblasts filled 100% of the plate, muscle cells (myotubes) were produced by differentiating the cells for a week through serum starvation (DMEM supplemented with 2% horse serum (HyClone) and 1% P/S). The differentiated muscle cells were treated with the *ginseng* seed oil of Preparation Example 1 (GSO), the *ginseng* berry extract of Preparation Example 2 (GB) or the red *ginseng* extract of Preparation Example 3 (RG) either alone (100 μg/mL) or in combination (100 μg/mL for each sample, 200 μg/mL for each combination) for 16 hours. As a positive control group, fenofibrate (100 μM), which is a PPARα agonist promoting energy metabolism in muscles, was used.

Then, RNA was extracted from the muscle cells treated with the sample using a TRIzol reagent (Invitrogen), and cDNA was synthesized using a RevertAid 1st strand cDNA synthesis kit (Fermentas). Q-PCR was performed using a CFX96 thermocycler (Bio-Rad), and the relative expression level of energy metabolism-related genes (acyl-CoA oxidase (ACO), carnitine palmitoyltransferase 1 (CPT1), peroxisome proliferator-activated receptor α (PPARα), PPARγ-coactivator 1α (PGC1α), mitochondrial transcription factor A (TFAM) and uncoupling protein 3 (UCP3)) was compared with respect to the expression level of cyclophilin in FIG. 3 (in FIG. 3, GSO denotes *ginseng* seed oil, GB denotes *ginseng* berry extract, RG denotes red *ginseng* extract, and Fano denotes fenofibrate).

Figure 3:
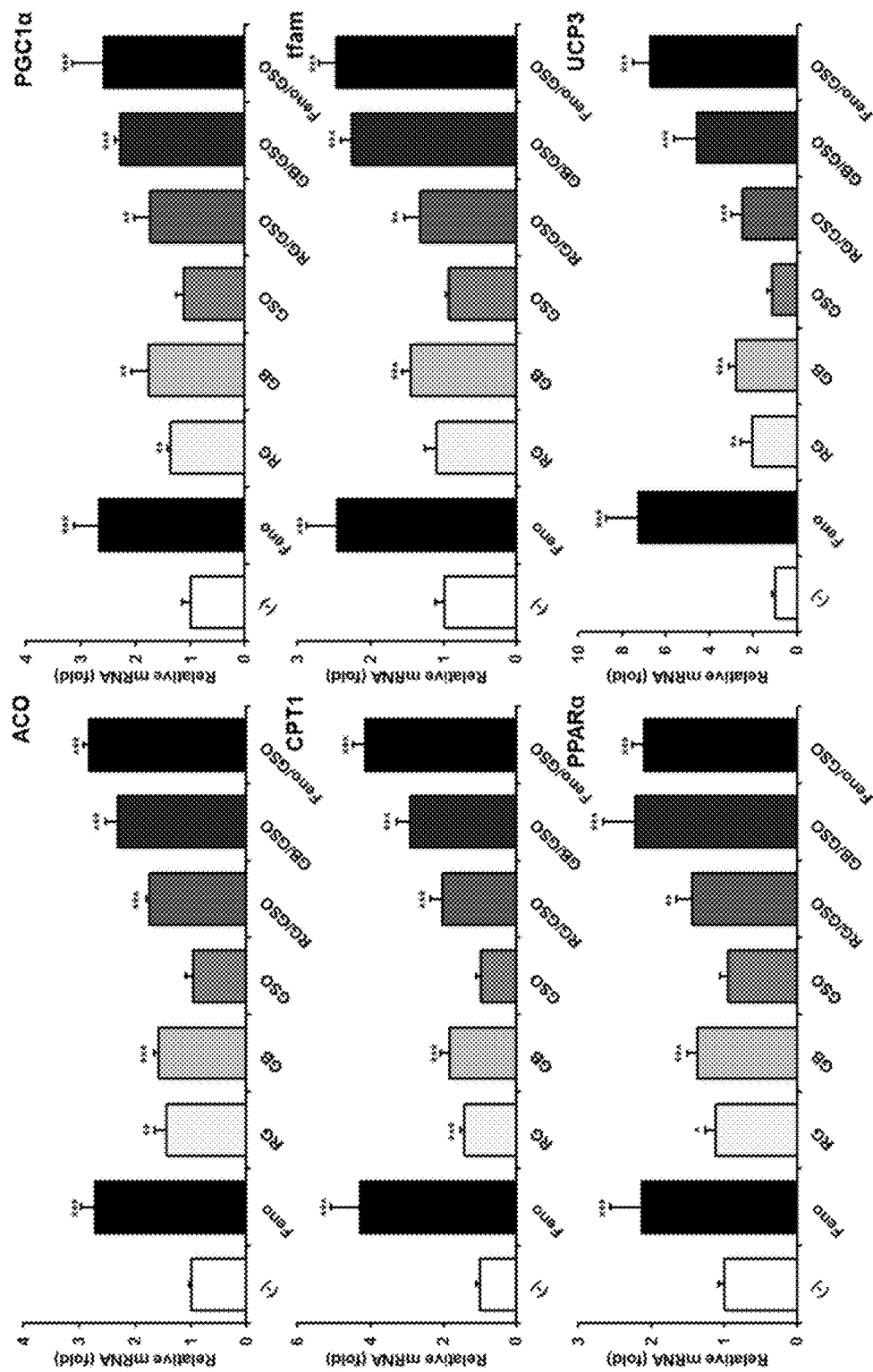
FIG. 3 shows the effect of promoting energy metabolism in muscle cells of *ginseng* seed oil and *ginseng* berry extract according to an aspect of the present disclosure.

As shown in FIG. 3, the *ginseng* berry extract showed higher expression level of fat oxidation- and mitochondria-related genes as compared to the red *ginseng* extract, and the *ginseng* seed oil had no significant effect on lipid metabolism in muscle cells. In addition, as a result of investigating the synergistic effect of the red *ginseng* extract, the *ginseng* berry extract and the *ginseng* seed oil, it was confirmed that the gene expression level was increased by about 20-30% when the *ginseng* seed oil was added to the red *ginseng* extract, whereas the increase was about 30-50% when the *ginseng* seed oil was added to the *ginseng* berry extract. Through this, it was confirmed that the *ginseng* seed oil increases the energy metabolism-promoting effect of the red *ginseng* extract and the *ginseng* berry extract, and the synergistic effect is more distinguishable for the *ginseng* berry extract as compared to the red *ginseng* extract. In addition, it was confirmed that the synergistic effect of promoting energy metabolism of the *ginseng* seed oil can be exhibited specifically in red *ginseng* and *ginseng* berry because the increase in energy metabolism owing to treatment with the *ginseng* seed oil was not observed in the fenofibrate-treated group.

[Test Example 4] Investigation of Increase of Mitochondria in Muscle Cells Depending on Addition of *Ginseng* Seed Oil After treating differentiated muscle cells with a sample under the same condition as in Test Example 3, the medium was removed by rinsing twice with PBS. Then, mitochondria were stained by treating the muscle cells with Mitotracker Green FM (Invitrogen) for 30 minutes. After washing 3 times with PBS, the cells were fixed with formaldehyde (Sigma-Aldrich) and observed under a fluorescence microscope (EVOS M5000). The result is shown in FIG. 4 (in FIG. 4, GSO denotes *ginseng* seed oil, GB denotes *ginseng* berry extract, RG denotes red *ginseng* extract, and Fano denotes fenofibrate).

As shown in FIG. 4, the group treated with the *ginseng* berry extract resulted in significant increase in mitochondria as compared to the group treated with the red *ginseng* extract, as expected from the increased expression of mitochondrial production-related genes (PGC1α and TFAM) measured in Test Example 3. In particular, the group treated with the *ginseng* berry extract and the *ginseng* seed oil together showed the increase of mitochondrial density similar to that of the positive control group (fenofibrate). Therefore, it is expected that the *ginseng* seed oil will actually promote energy metabolism in muscle cells.

[Formulation Example 1] Health Beverage

A health beverage was prepared according to a common method with the composition described in Table 4.

TABLE 4

| Ingredients | Contents |
| --- | --- |
| Ginseng seed oil | 2 g |
| Ginseng berry extract | 20 g |
| Gellan gum | 0.1 g |
| Vitamin A acetate | 70 μg |
| Vitamin E | 1 mg |
| Vitamin $B_1$ | 0.13 mg |
| Vitamin $B_2$ | 0.15 mg |
| Vitamin $B_6$ | 0.5 mg |
| Vitamin $B_{12}$ | 0.2 μg |
| Vitamin C | 10 mg |
| Biotin | 10 μg |
| Oligosaccharide | 2.5 g |
| Purified water | 125 mL |

According to the common method for preparing a health beverage, after mixing the above ingredients and stirring at 80° C. for about 1 hour, the prepared solution was filtered and sterilized.

[Formulation Example 2] Soft Capsule

A soft capsule was prepared according to a common method by mixing 50 mg of *ginseng* seed oil, 320 mg of *ginseng* berry extract, 60 mg of L-carnitine, 2 mg of palm oil, 8 mg of hydrogenated vegetable oil, 4 mg of yellow beeswax and 6 mg of lecithin and filling the mixture in a capsule.

[Formulation Example 3] Liquid

A liquid was prepared according to a common method by mixing 2 g of *ginseng* seed oil, 25 g of *ginseng* berry extract, 3 g of isomerized sugar, 1 g of mannitol and 70 mL of purified water, filling the mixture in a brown bottle and then sterilizing the same.

[Formulation Example 4] Drink

After mixing 10 g of *ginseng* seed oil, 100 g of *ginseng* berry extract, 10 g of glucose, 0.6 g of citric acid and 25 g of oligosaccharide syrup and adding 500 mL of purified water, 200 mL of the mixture was filled in a bottle. Then, a drink was prepared by sterilizing at 130° C. for 4-5 seconds.

The invention claimed is:
1. An emulsion composition comprising a seed oil of *ginseng* and a berry extract of *ginseng*, wherein a weight ratio of the seed oil of *ginseng* and the berry extract of *ginseng* is 1: 2-100.

2. The emulsion composition according to claim 1, wherein the *ginseng* comprises one or more selected from a group consisting of Korean *ginseng* (*Panax ginseng*), American *ginseng* (*Panax quinquefolia*), tienchi *ginseng* (*Panax notoginseng*), Vietnamese *ginseng* (*Panax vietnamensis*), Japanese *ginseng* (*Panax japonicus*), *Panax elegatior, Panax wangianus, Panax bipinnatifidus* and *Panax pseudoginseng*.

3. The emulsion composition according to claim 1, wherein the berry extract of *ginseng* is an extract of water, a $C_1$-$C_6$ alcohol, or a mixture solvent thereof.

4. The emulsion composition according to claim 1, wherein the composition comprises the seed oil of *ginseng* in an amount of 0.001-70 wt % based on the total weight of the composition.

5. The emulsion composition according to claim 1, wherein the composition comprises the berry extract of *ginseng* in an amount of 0.01-60 wt % based on the total weight of the composition.

6. The emulsion composition according to claim 1, wherein the composition further comprises gum and dietary fiber.

7. The emulsion composition according to claim 6, wherein the gum comprises one or more selected from a group consisting of xanthan gum, carrageenan gum, guar gum, gellan gum, locust bean gum, tamarind gum, Arabic gum, konjac, pectin, agar, tapioca starch, dextrin, hydroxypropyl methylcellulose (HPMC), sodium alginate and modified starch.

8. The emulsion composition according to claim 6, wherein the dietary fiber comprises one or more selected from a group consisting of citrus dietary fiber and wheat dietary fiber.

9. The emulsion composition according to claim 1, wherein the composition is a liquid composition.

10. The emulsion composition according to claim 1, wherein the composition is a food composition.

* * * * *